United States Patent
Xu et al.

(10) Patent No.: US 9,057,794 B2
(45) Date of Patent: Jun. 16, 2015

(54) METHOD FOR MEASURING SUBTERRANEAN FORMATION DENSITY USING A NEUTRON GENERATOR

(75) Inventors: Libai Xu, Katy, TX (US); Kevin S. McKinny, Hudson, OH (US); Cornelis Huiszoon, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 55 days.

(21) Appl. No.: 13/819,264

(22) PCT Filed: Aug. 10, 2011

(86) PCT No.: PCT/US2011/047216
§ 371 (c)(1),
(2), (4) Date: Aug. 7, 2013

(87) PCT Pub. No.: WO2012/027106
PCT Pub. Date: Mar. 1, 2012

(65) Prior Publication Data
US 2013/0327933 A1    Dec. 12, 2013

Related U.S. Application Data

(60) Provisional application No. 61/377,144, filed on Aug. 26, 2010.

(51) Int. Cl.
*G01V 5/10* (2006.01)
(52) U.S. Cl.
CPC ............... *G01V 5/101* (2013.01); *G01V 5/104* (2013.01)
(58) Field of Classification Search
CPC ....... G01V 5/102; G01V 5/105; G01V 5/107; G01V 5/108; G01V 5/125

USPC ............ 250/269.4, 269.5, 269.8, 264, 269.6, 250/262
See application file for complete search history.

(56) References Cited

U.S. PATENT DOCUMENTS

| | | | | |
|---|---|---|---|---|
| 2,958,780 | A * | 11/1960 | Dewan | 376/108 |
| 3,691,378 | A * | 9/1972 | Hopkinson et al. | 250/264 |
| 3,869,608 | A * | 3/1975 | Scherbatskoy | 376/160 |
| 3,885,160 | A * | 5/1975 | Dillingham | 376/191 |
| 3,886,355 | A | 5/1975 | Culver | |
| 4,450,354 | A | 5/1984 | Smith et al. | |
| 4,581,532 | A * | 4/1986 | Givens et al. | 250/266 |
| 4,717,825 | A * | 1/1988 | Smith et al. | 250/256 |
| 4,973,839 | A * | 11/1990 | Nelligan | 250/269.4 |
| 5,023,449 | A | 6/1991 | Holenka et al. | |
| 5,250,806 | A * | 10/1993 | Rhein-Knudsen et al. | 250/254 |
| 5,313,504 | A * | 5/1994 | Czirr | 376/153 |

(Continued)

OTHER PUBLICATIONS

International Search Report for PCT Application Serial No. PCT/US2011/047216 dated Feb. 17, 2012.

(Continued)

*Primary Examiner* — David Porta
*Assistant Examiner* — Djura Malevic
(74) *Attorney, Agent, or Firm* — Cathy Hewitt; Michael Dae

(57) ABSTRACT

A method for determining a bulk formation density using a neutron generator includes detected secondary gamma rays and evaluating the detected gamma rays according to predetermined selection criteria. Selected gamma rays are then used to compute the formation density. The selection criteria may include, for example, a time delay between the detection of a neutron and an associated particle and/or a direction of propagation of the neutron.

14 Claims, 4 Drawing Sheets

(56) References Cited

U.S. PATENT DOCUMENTS

| | | | |
|---|---|---|---|
| 5,608,215 A * | 3/1997 | Evans | 250/269.6 |
| 5,804,820 A * | 9/1998 | Evans et al. | 250/269.6 |
| 5,804,822 A | 9/1998 | Brass et al. | |
| 5,825,024 A | 10/1998 | Badruzzaman | |
| 5,900,627 A * | 5/1999 | Odom et al. | 250/269.7 |
| 6,297,507 B1 * | 10/2001 | Chen et al. | 250/370.11 |
| 6,590,202 B2 * | 7/2003 | Mickael | 250/269.2 |
| 6,944,548 B2 * | 9/2005 | Radtke et al. | 702/8 |
| 7,294,829 B2 | 11/2007 | Gilchrist | |
| 7,334,465 B2 | 2/2008 | Smit et al. | |
| 7,432,499 B2 * | 10/2008 | Edwards et al. | 250/259 |
| 7,432,500 B2 * | 10/2008 | Sale | 250/269.3 |
| 7,880,134 B2 * | 2/2011 | Kirkwood et al. | 250/269.6 |
| 7,950,473 B2 * | 5/2011 | Sugiura | 175/45 |
| 7,999,220 B2 * | 8/2011 | Odom | 250/269.3 |
| 8,049,164 B2 * | 11/2011 | Kirkwood et al. | 250/269.6 |
| 8,076,634 B2 * | 12/2011 | Stoller | 250/269.1 |
| 8,269,162 B2 * | 9/2012 | Kirkwood et al. | 250/269.6 |
| 8,299,420 B2 * | 10/2012 | Stoller | 250/269.4 |
| 8,338,777 B2 * | 12/2012 | Nikitin et al. | 250/269.6 |
| 8,497,685 B2 * | 7/2013 | Sugiura | 324/346 |
| 8,521,435 B2 * | 8/2013 | Minh et al. | 702/11 |
| 8,600,115 B2 * | 12/2013 | Liu | 382/107 |
| 8,731,888 B2 * | 5/2014 | Yin et al. | 703/10 |
| 2002/0036260 A1 * | 3/2002 | Adolph | 250/269.1 |
| 2002/0130267 A1 * | 9/2002 | Odom et al. | 250/390.11 |
| 2002/0150194 A1 * | 10/2002 | Wielopolski et al. | 376/160 |
| 2002/0170348 A1 * | 11/2002 | Roscoe et al. | 73/152.02 |
| 2003/0178560 A1 * | 9/2003 | Odom et al. | 250/269.2 |
| 2004/0128073 A1 * | 7/2004 | Radtke et al. | 702/8 |
| 2004/0222368 A1 * | 11/2004 | Odom et al. | 250/269.2 |
| 2005/0028586 A1 * | 2/2005 | Smits et al. | 73/152.14 |
| 2005/0067160 A1 * | 3/2005 | Jacobson | 166/250.01 |
| 2006/0226351 A1 * | 10/2006 | Stoller et al. | 250/269.1 |
| 2007/0119243 A1 * | 5/2007 | Smits et al. | 73/152.14 |
| 2007/0241275 A1 | 10/2007 | Guo et al. | |
| 2009/0026359 A1 * | 1/2009 | Stephenson et al. | 250/269.7 |
| 2009/0045329 A1 * | 2/2009 | Stoller | 250/269.4 |
| 2009/0114806 A1 * | 5/2009 | Kirkwood et al. | 250/269.6 |
| 2009/0114807 A1 * | 5/2009 | Kirkwood et al. | 250/269.7 |
| 2009/0210161 A1 * | 8/2009 | Duenckel et al. | 702/8 |
| 2009/0242746 A1 * | 10/2009 | Pemper et al. | 250/269.6 |
| 2009/0276158 A1 * | 11/2009 | Kirkwood et al. | 702/8 |
| 2009/0283691 A1 * | 11/2009 | Stoller | 250/390.1 |
| 2009/0296084 A1 * | 12/2009 | Odom | 356/317 |
| 2010/0262371 A1 * | 10/2010 | Oraby | 702/8 |
| 2011/0062319 A1 * | 3/2011 | Nikitin et al. | 250/254 |
| 2011/0204217 A1 * | 8/2011 | Oraby et al. | 250/269.6 |
| 2013/0092827 A1 * | 4/2013 | Nikitin et al. | 250/254 |

OTHER PUBLICATIONS

Jacobson, et al., "An improved formation density measurement using PNC Tools", SPE 90708—SPE Annual Technical Conference and Exhibition, Houston, Texas, Sep. 2004, pp. 1-9.

Neuman, et al., "An Investigation of Density Derived from Pulsed Neutron Capture Measurements", SPE 56647—SPE Annual Technical Conference and Exhibition, Houston, Texas, Oct. 1999, pp. 1-8.

Odom, et al., "Improvements in a Through-Casing Pulsed-Neutron Density Log", SPE 71742—SPE Annual Technical Conference and Exhibition, New Orleans, Louisiana, 2001, pp. 1-9.

Weller, et al., "A new integrated LWD platform brings next-generation formation evaluation services", SPWLA 46th Annual Logging Symposium, New Orleans, 2005, pp. 1-15.

National Research Council, "Radiation Source Use and Replacement: Abbreviated Version—Chapter 10, Implementation Options for Encouraging Replacement of Radionuclide Radiation Sources With Alternatives", The National Academies Press, 2008, pp. 159-173.

* cited by examiner

METHOD FOR MEASURING SUBTERRANEAN FORMATION DENSITY USING A NEUTRON GENERATOR

FIELD OF THE INVENTION

The present invention relates generally to methods for making formation density measurements in a subterranean borehole. More particularly, the present invention relates to methods for measuring formation density measurements using a neutron generator.

BACKGROUND OF THE INVENTION

Nuclear logging techniques are commonly used in both wireline logging and logging while drilling operations. For example, neutron logging techniques are commonly employed to compute formation porosity. Gamma ray logging techniques are employed to compute bulk formation density, from which formation porosity can also be derived, possibly in combination with the neutron porosity measurement. Conventional bulk density measurements commonly make use of an isotopic source of gamma rays (also referred to as a chemical source), such as $^{137}$Cs. Such radioactive chemical sources have obvious disadvantages from a radiation safety viewpoint and these disadvantages are of some concern in measurement or logging while drilling (MLWD) applications. Owing to these safety concerns (and potential security concerns as well), there is a desire in the oilfield services industry to replace the traditional $^{137}$Cs source (see, for example, *National Academy of Sciences, Radiation Source Use and Replacement: Abbreviated Version, The National Academies Press*, 2008).

U.S. Pat. Nos. 5,608,215 and 5,804,822 to Evans et al disclose nuclear logging methods for measuring a formation density that employ an accelerator based neutron generator. Neutrons emerging from the accelerator interact with the tool, the borehole fluid, and the formation to produce gamma rays that can be detected elsewhere in the tool. These gamma rays may be thought of as being generated by a "secondary" gamma ray source (as opposed to a primary source such as the aforementioned chemical source). Neutrons may also be detected at the tool and used to correct for neutron attenuation effects on the secondary gamma ray source. The detected gamma rays (and neutrons) are analyzed to estimate a formation bulk density.

While the '215 and '822 patents disclose methods for estimating a formation bulk density without using a chemical source of gamma rays, the disclosed methods tend to be inaccurate. For example, these patents disclose that secondary gamma rays are produced via interactions of the neutrons with the logging tool, the borehole fluid, and the formation. It is further disclosed that these secondary gamma rays are used to compute the formation density. It will be readily apparent to those of ordinary skill in the art that gamma rays originating in the tool and the borehole fluid carry less information pertaining to the formation density than those from the formation. The failure to discriminate between gamma rays originating in the formation and gamma rays originating in the tool or the borehole fluid essentially averages all detected gamma rays, which can lead to significant errors in the estimated formation density.

Moreover, the secondary gamma rays can be generated via two distinct neutron interactions; inelastic scattering events and neutron capture events. The number of gamma rays produced via neutron capture events tends to be strongly influenced by the amount of hydrogen and the thermal neutron capture cross section of the formation. The number of gamma rays produced via inelastic scattering events is less dependent on these quantities and therefore tends to be more directly related to formation density. Odom et al in U.S. Pat. No. 5,900,627 attempt to eliminate gamma rays produced via neutron capture events by the use of a pulsed neutron generator. While such pulsing can eliminate many of the capture gamma rays, further improvements are needed to more fully discriminate between the inelastic and capture gamma rays.

Therefore there is a need in the art for an improved formation density logging technique that makes use of a neutron generator. In particular there is a need for a method that improves the accuracy of the measured formation density.

SUMMARY OF THE INVENTION

The present invention addresses the above-described need for improved nuclear logging methods for determining formation density in downhole drilling operations. Aspects of this invention include methods for determining a formation density in which neutrons are generated using a neutron generator. Corresponding secondary gamma rays are detected and evaluated according to predetermined selection criteria. The selected gamma rays are then used to compute the formation density. The selection criteria may include, for example, a time delay between the detection of a neutron and the associated particle and/or a direction of propagation of the neutron.

Exemplary embodiments of the present invention may advantageously provide several technical advantages. For example, embodiments of the invention provide for improved accuracy formation density measurements to be made in wireline and MWD operations using a neutron generator. The improved accuracy is obtained at least in part by selecting primarily inelastic gamma rays generated in the formation.

The invention also advantageously enables density images to be made using a neutron generator. While neutrons are emitted by a neutron generator in all directions, detection of an associated particle enables the consideration of only neutrons that are emitted within a certain solid angle to be considered for deriving the density of the formation. By including information on the location of the "secondary" gamma source, a density image can thus be generated, even if the tool does not rotate in the borehole.

In one aspect the present invention includes a method for measuring a formation density of a subterranean formation. The neutrons are generated and emitted into a surrounding borehole environment in a subterranean borehole using an accelerator based neutron generator. Secondary gamma rays are detected in the subterranean borehole. The secondary gamma rays are generated by an interaction between the generated neutrons and the surrounding borehole environment. A processor identifies certain ones of the detected secondary gamma rays based upon predetermined selection criteria and then processes the identified a gamma rays to compute a formation density of the subterranean formation. The selection criteria may include, for example, coincidence with an associated particle, a time delay within predetermined limits between an associated particle and to the detected gamma ray, and/or an associated particle having a circumferential position or azimuth angle within predetermined limits.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
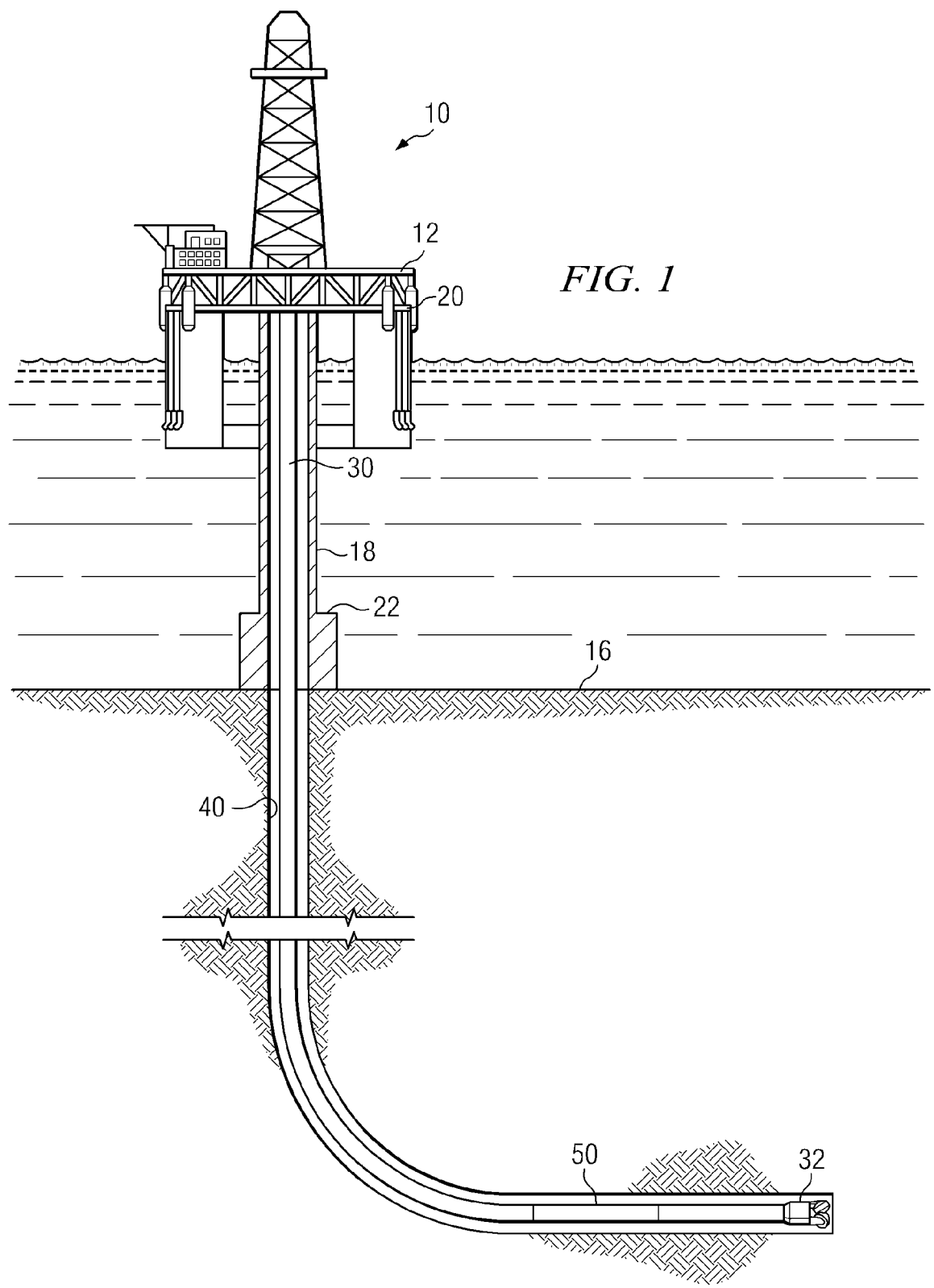
FIG. 1 depicts a conventional drilling rig on which exemplary method embodiments of the present invention may be utilized.

FIG. 1 depicts an exemplary offshore drilling assembly, generally denoted 10, suitable for employing exemplary method embodiments in accordance with the present invention. In FIG. 1 a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes drill bit 32 and a nuclear logging tool 50. Drill string 30 may optionally further include substantially any number of other downhole tools including, for example, other measurement while drilling or logging while drilling tools (referred to herein collectively as MLWD tools), stabilizers, a rotary steerable tool, and a downhole drilling motor.

It will be understood by those of ordinary skill in the art that the deployment illustrated on FIG. 1 is merely exemplary. It will be further understood that exemplary embodiments in accordance with the present invention are not limited to use with a semisubmersible platform 12 as illustrated on FIG. 1. The invention is equally well suited for use with any kind of subterranean drilling operation, either offshore or onshore. While FIG. 1 depicts a drilling operation, it will also be understood that the invention is not limited to MLWD methods, but may also be utilized in wireline operations.

Figure 2:
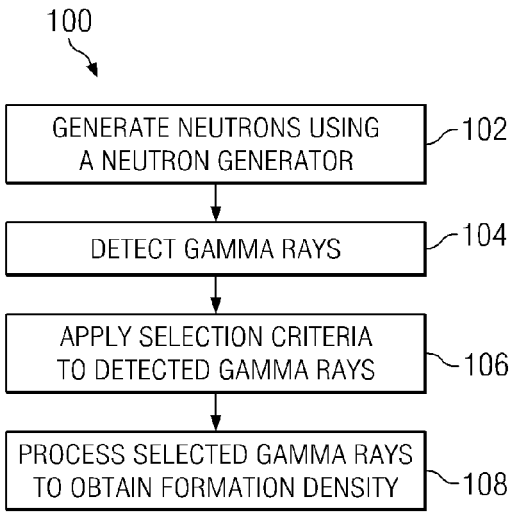
FIG. 2 depicts a flowchart of one exemplary method embodiment in accordance with the present invention.

FIG. 2 depicts a flow chart of one exemplary method embodiment 100 in accordance with the present invention. Method 100 includes a method for estimating a bulk formation density from the detection of gamma rays. At 102 neutrons are generated using a neutron generator, for example, an accelerator based generator making use of the deuterium-tritium (D-T) fusion reaction. The neutrons emerge from the generator and interact with the borehole (i.e., with the environment surrounding the borehole including the tool, the borehole fluid and the formation) to produce secondary gamma rays as described above in the Background Section. These gamma rays may be detected at 104 using one or more gamma ray detectors deployed on the downhole tool. Predetermined selection criteria are applied to the detected gamma rays at 106. Gamma rays that meet the criteria are selected while that those that do not meet the criteria are rejected. The selected gamma rays are then processed at 108 to compute a formation density.

Figure 3:
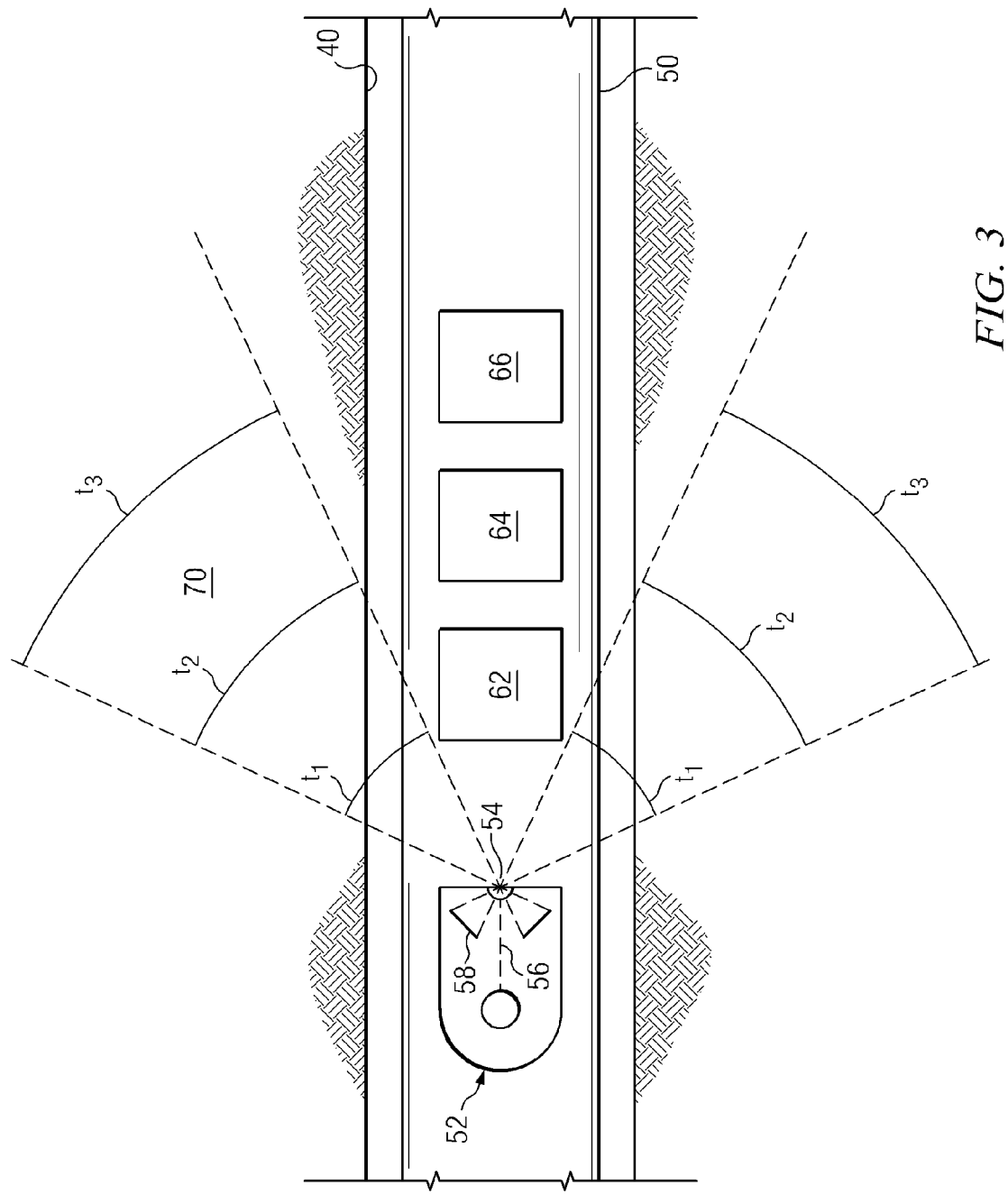
FIG. 3 depicts an exemplary nuclear logging tool configuration on which method embodiments of the present invention may be utilized.

FIG. 3 depicts one exemplary embodiment of a nuclear logging tool 50 suitable for use with methods in accordance with the present invention. Logging tool 50 is shown deployed in a subterranean borehole 40 and may include a wireline logging tool or an MLWD tool (e.g., as depicted on FIG. 1). The invention is not limited in these regards.

Logging tool 50 includes a neutron generator 52 configured to provide high energy neutrons. For example, neutron generator 52 may include an accelerator based generator that makes use of the deuterium-tritium (D-T) fusion reaction. In one such embodiment, a tritium containing target 54 is bombarded with high energy deuterium ions (depicted at 56) to produce 14 MeV neutrons and associated 3.5 MeV alpha particles via the nuclear fusion reaction: $^2D+^3T=^4\alpha+^1n$. Those of ordinary skill in the nuclear arts will appreciate that the alpha particle and the neutron are produced simultaneously and emitted in opposite directions (they are therefore correlated in time and space). As a result, the direction of the alpha particle specifies the trajectory of the neutron (and visa versa).

Figure 4:
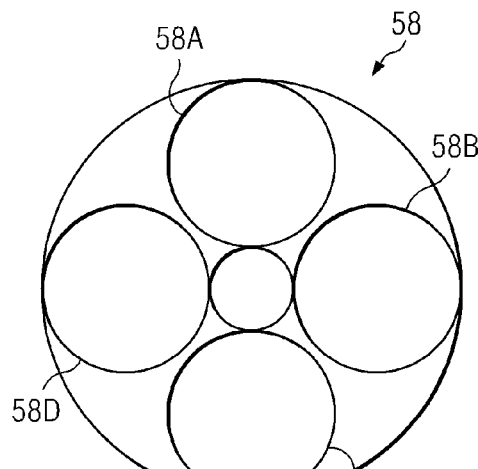
FIG. 4 depicts a circular cross section of one exemplary embodiment of the alpha particle detector shown on FIG. 3.

Neutron generator 52 further includes at least one (and preferably a plurality of) alpha particle detectors 58 deployed about the target 54 (e.g., about the deuterium ion beam 56 as depicted). Each alpha detector typically includes a scintillator, a light guide, and a photomultiplier tube. The alpha particle detector(s) 58 is(are) configured to detect alpha particles emitted from the target in directions contained within a predetermined solid angle. The alpha particle detector(s) is(are) configured (i.e., sized, shaped, and located with respect to the target) such that the solid angle corresponds to neutrons that are emitted outward into the formation as depicted. In embodiments having a plurality of detectors, each individual detector makes up a portion of that solid angle so that the direction of any particular detected alpha particle (and by extension its associated neutron) can be determined based upon which of the individual detectors receives the particle. For example, FIG. 4 depicts a circular cross section of an exemplary alpha particle detector (looking up the longitudinal axis of the tool 50) having four circumferentially spaced detectors 58A, 58B, 58C, and 58D.

With continued reference to FIG. 3, logging tool 50 typically further includes a neutron shield 62 located axially between the neutron generator 52 and one or more detectors 64 and 66. Logging tool 50 includes at least one gamma ray detector 66 (and although not depicted preferably includes at least first and second axially spaced gamma ray detectors). The gamma ray detector(s) may include, for example, a conventional NaI or $BaF_2$ gamma ray detector. Logging tool 50 may further optionally include a conventional neutron detector 64, for example, a conventional $^3$He neutron detector. It will be understood that the invention is not limited to any particular detector types. Nor is the invention limited to a tool configuration including first and second detectors. A single detector configured to detect both gamma rays and neutrons may be sufficient.

Figure 5:
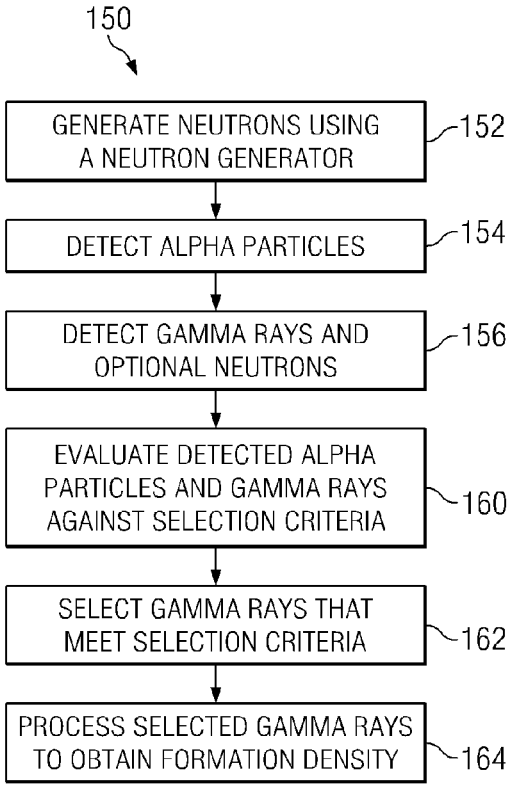
FIG. 5 depicts a flowchart of another method embodiment in accordance with the present invention.

FIG. 5 depicts a flow chart of an alternative method embodiment 150 in accordance with the present invention. Method 150 is similar to method 100 in that it includes a method for computing a formation density from the detection of gamma rays. Neutrons are generated using a neutron generator and emitted into a subterranean formation at 152. The neutron generator may include, for example, an accelerator based generator making use of a deuterium-tritium (D-T) fusion reaction as described in more detail above with respect to FIGS. 2 and 3. Gamma rays are detected at 154 using at least one gamma ray detector (e.g., detectors 66 on FIG. 3). Alpha particles are detected at 156 using at least one alpha particle deployed in close proximity to the neutron generator (e.g. detector(s) 58 on FIG. 3). Neutrons may also optionally be detected at 156 (e.g., using neutron detector 64 on FIG. 3).

The detected alpha particles and gamma rays are evaluated in combination at 160 to determine whether or not detected gamma rays meet various selection criteria. Gamma rays that meet the selection criteria may then be selected at 162 and processed at 164 to obtain a density of the subterranean formation using computational methods known to those of skill in the art. Detected neutrons may also be utilized in the formation density processing at 164. The invention is not limited in these regards.

The detected alpha particles and gamma rays may be evaluated at 160, for example, for coincidence. Those of ordinary skill in the art will readily recognize that by coincidence it is meant that the alpha particular and the gamma ray are associated with one another (i.e., the alpha particle and the emitted neutron from which the gamma ray is generated are associated in time and space from the same nuclear event). Such coincidence may be determined, for example, via a time correlation (e.g., a gamma ray detected within 10 nanoseconds of an alpha particle may be said to be in coincidence with the alpha particle). Those of skill in the art will appreciate time correlation may be determined via software or hardware means. The selection criteria at 162 may include coincidence such that only gamma rays having coincidence with a corresponding alpha particle are selected.

The evaluation at 160 may further include a measurement of a time delay between a detected alpha particle and an associated gamma ray. Such a time delay is approximately equal to the time of flight of the neutron generated at 152 (since the velocity of the gamma ray is much greater than that of the neutron) and therefore tends to be indicative of the distance traveled by the neutron prior to inelastic scattering and generation of the detected gamma ray. The selection criteria at 162 may require that the time delay be within a predetermined range (e.g., within 5 to 10 nanoseconds). By selecting an appropriate range of time delays, only gamma rays emitted within a desired location in the formation are selected (e.g., between arcs $t_2$ and $t_3$ on FIG. 2).

The evaluation at 160 may still further include an identification of a circumferential or azimuthal direction of the detected alpha particles. For example, in a tool embodiment having a plurality of alpha detectors (e.g., as depicted on FIG. 4), the particular detector at which the alpha particle is detected may be used to identify a circumferential position on the tool. The detector may be further correlated with a conventional azimuth measurement to identify an azimuthal position (or direction). The selection criteria at 162 may include the circumferential or azimuthal position. For example, the selection criteria may require that the selected gamma rays be coincident with alpha particles detected by a particular alpha particle detector (e.g., detector 58A on FIG. 4). Such selection criteria may enable density imaging measurements to be made (e.g., in applications in which the tool is substantially non-rotating). Alternatively, the selection criteria may require that the selected gamma rays be coincident with alpha particles detected within a predetermined range of azimuth angles (e.g., azimuth angles defining the high side of the tool). Again, such criteria may enable density imaging measurements to be made (e.g., in applications in which the tool is rotating in the borehole).

Figure 6:
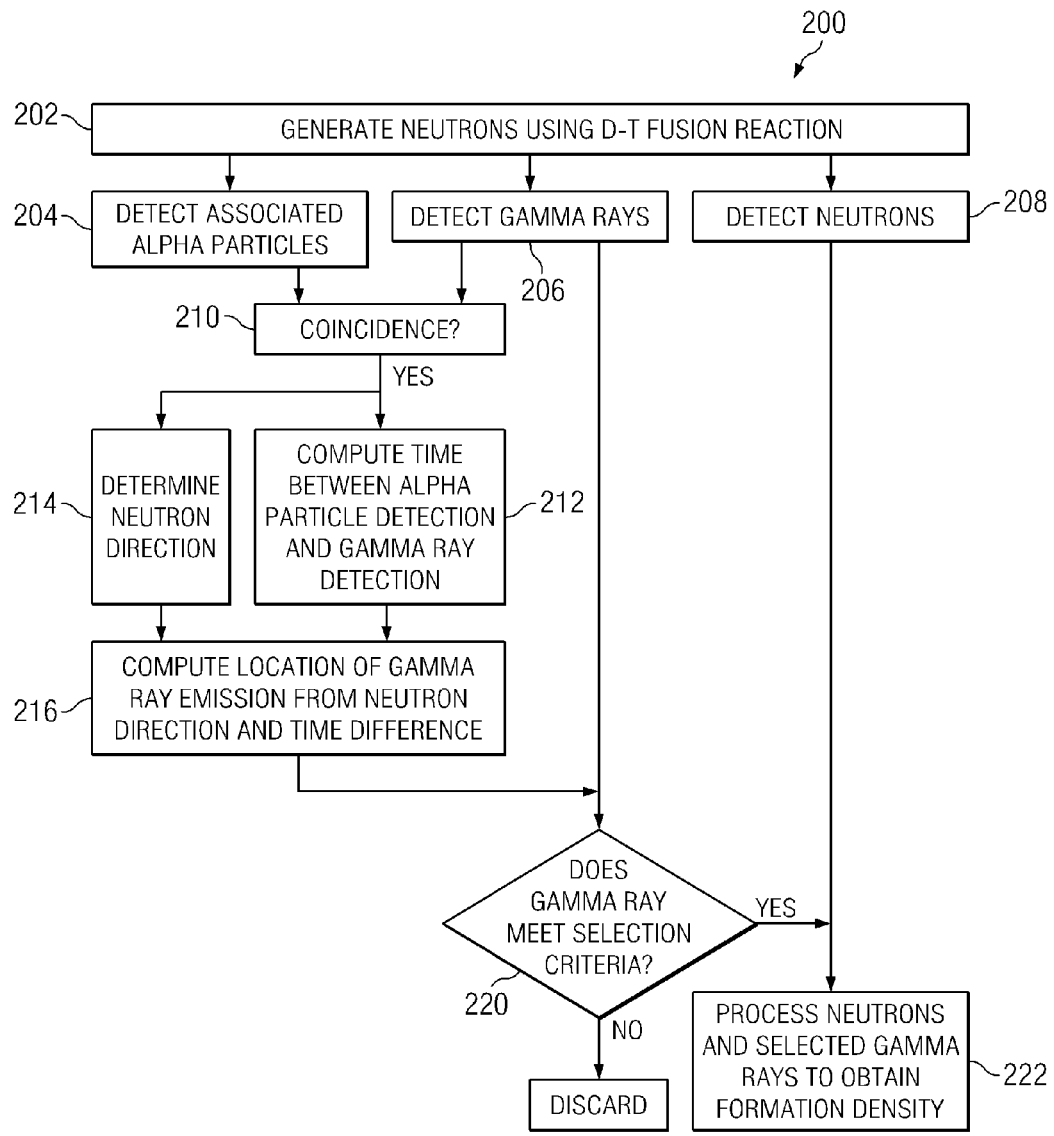
FIG. 6 depicts a block diagram of still another method embodiment in accordance with the present invention.

FIG. 6 depicts a block diagram of another method embodiment in accordance with the present invention. Neutrons are generated, as described above, at 202 using an accelerator based neutron generator. Alpha particles, gamma rays, and neutrons are detected at 204, 206, and 208, respectively. At 210 the detected alpha particles and gamma rays are evaluated for coincidence. In the absence of coincidence, the detected gamma rays are discarded. When coincidence is obtained, a time difference between the alpha particle detection and gamma ray detection is computed at 212. The alpha particles are further evaluated at 214 to determine a direction of neutron propagation (e.g., by determining which of a plurality of detectors received the alpha particle). An approximate location of the gamma ray emission is determined at 216 from the time difference and the neutron direction. Each of the detected gamma rays is then evaluated at 220 to determine whether or not it meets predetermined selection criteria. Gamma rays that meet the selection criteria are then processed in combination with the detected neutrons at 222 to determine a formation density. Gamma rays not meeting the predetermined selection criteria may be discarded.

It will be understood that the aspects and features of the present invention may be embodied as logic that may be processed by, for example, a computer, a microprocessor, hardware, firmware, programmable circuitry, or any other processing device well known in the art. Similarly the logic may be embodied on software suitable to be executed by a processor, as is also well known in the art. The invention is not limited in this regard. The software, firmware, and/or processing device may be included, for example, on a downhole assembly in the form of a circuit board, on board a sensor sub, or MLWD sub. Alternatively the processing system may be at the surface and configured to process data sent to the surface by sensor sets via a telemetry or data link system also well known in the art. Electronic information such as logic, software, or measured or processed data may be stored in memory (volatile or non-volatile), or on conventional electronic data storage devices such as are well known in the art.

Although the present invention and its advantages have been described in detail, it should be understood that various changes, substitutions and alternations can be made herein without departing from the spirit and scope of the invention as defined by the appended claims.

We claim:

1. A method for measuring a formation density of a subterranean formation, the method comprising:
   (a) generating neutrons in a subterranean borehole using an accelerator based neutron generator, said generated neutrons being emitted into a surrounding borehole environment;
   (b) detecting secondary gamma rays in the subterranean borehole, the secondary gamma rays being generated by an interaction between the neutrons generated in (a) and the surrounding borehole environment, and detecting neutrons in the subterranean borehole, the neutrons returning after being emitted into the surrounding borehole environment and the neutrons representing an azimuthally average neutron count;
   (c) causing a processor to identify certain ones of the secondary gamma rays detected in (b) based upon predetermined selection criteria identifying the secondary gamma rays as resulting from a neutron interacting with an azimuthally specific part of the formation less than a 360 degree azimuthal angle around the formation; and (d) causing a processor to process the gamma rays identified in (c) and the neutrons generated in (b) to compute a formation density of the subterranean formation.

2. The method of claim 1, wherein the neutrons are generated in (a) via bombarding a tritium containing target with high energy deuterium ions.

3. The method of claim 1, wherein (b) further comprises detecting associated particles generated by the accelerator based neutron generator.

4. The method of claim 3, wherein the predetermined selection criteria comprise coincidence between the gamma rays and associated particles detected in (b).

5. The method of claim 3, wherein the predetermined selection criteria comprise a time delay within predetermined limits between the detection of an associated particle and a gamma ray in (b).

6. The method of claim 3, wherein the predetermined selection criteria comprise said detected associated particles having a circumferential or azimuthal position within predetermined limits.

7. The method of claim 3, wherein the associated particles are alpha particles.

8. A method for measuring a formation density of a subterranean formation, the method comprising:
 (a) generating neutrons and alpha particles in a subterranean borehole using an accelerator based neutron detector, said generated neutrons being emitted into a surrounding borehole environment;
 (b) detecting secondary gamma rays and neutrons that return after being emitted into the surrounding borehole, the secondary gamma rays being generated by an interaction between the neutrons generated in (a) and the surrounding borehole environment and the neutrons representing a neutron count relating to a first azimuthal solid angle;
 (c) detecting alpha particles generated by the accelerator based neutron generator;
 (d) causing a processor to identify a subset of certain ones of the secondary gamma rays detected in (b) for which there is coincidence with corresponding alpha particles detected in (c) such that the identified secondary gamma rays correspond to a second azimuthal solid angle different from the first azimuthal solid angle;
 (e) causing a processor to process the gamma rays identified in (d) and the neutrons identified in (b) to compute a formation density of the subterranean formation.

9. The method of claim 8, wherein the neutrons are generated in (a) via bombarding a tritium containing target with high energy deuterium ions.

10. A method for measuring a formation density of a subterranean formation, the method comprising:
 (a) generating neutrons and alpha particles in a subterranean borehole using an accelerator based neutron detector, said generated neutrons being emitted into a surrounding borehole environment;
 (b) detecting alpha particles generated by the accelerator based neutron generator;
 (c) detecting secondary gamma rays and neutrons that return after being emitted into the surrounding borehole, the secondary gamma rays being generated by an interaction between the neutrons generated in (a) and the surrounding borehole environment;
 (d) measuring a time delay between the alpha particles detected in (b) and corresponding gamma rays detected in (c);
 (e) causing a processor to identify the secondary gamma rays detected in (c) in which the time delay measured in (d) is within predetermined limits such that the identified gamma rays correspond to a different total solid azimuthal angle from the formation than the neutrons identified in (c); and
 (f) causing a processor to process the gamma rays identified in (e) and the neutrons identified in (c) to compute a formation density of the subterranean formation.

11. The method of claim 10, wherein the neutrons are generated in (a) via bombarding a tritium containing target with high energy deuterium ions.

12. A method for measuring a formation density of a subterranean formation, the method comprising:
 (a) generating neutrons and alpha particles in a subterranean borehole using an accelerator based neutron detector, said generated neutrons being emitted into a surrounding borehole environment;
 (b) detecting alpha particles generated by the accelerator based neutron generator;
 (c) detecting secondary gamma rays and neutrons that return after being emitted into the surrounding borehole, the secondary gamma rays being generated by an interaction between the neutrons generated in (a) and the surrounding borehole environment and the neutrons representing an azimuthally average neutron count;
 (d) identifying a circumferential or an azimuthal position of the alpha particles detected in (b);
 (e) causing a processor to identify the secondary gamma rays detected in (c) for which the corresponding alpha particles have a circumferential or azimuthal position within predetermined limits that are less than a total circumferential position or a total azimuthal position; and
 (f) causing a processor to process the gamma rays identified in (e) and the neutrons identified in (c) to compute a formation density of the subterranean formation.

13. The method of claim 12, wherein the neutrons are generated in (a) via bombarding a tritium containing target with high energy deuterium ions.

14. The method of claim 12, wherein:
 (d) further comprises measuring a time delay between the alpha particles detected in (b) and corresponding gamma rays detected in (c);
 (e) comprises causing a processor to identify the secondary gamma rays detected in (c) for which (i) the corresponding alpha particles have a circumferential or azimuthal position within predetermined limits and (ii) the time delay measured in (d) is within predetermined limits.

\* \* \* \* \*